TELEVISION SIGNAL RECEIVER TERMINAL

Filed April 18, 1962

Inventors
JOHN G. McALLAN
JOHN D. LAING
By Philip M. Bolton
Attorney

United States Patent Office 3,144,512
Patented Aug. 11, 1964

3,144,512

TELEVISION SIGNAL RECEIVER TERMINAL

John Gilbert McAllan and John Douglas Laing, London, England, assignors to International Standard Electric Corporation, New York, N.Y., a corporation of Delaware Filed Apr. 18, 1962, Ser. No. 188,350
Claims priority, application Great Britain May 3, 1961
10 Claims. (Cl. 178—7.3)

Figure 1A:
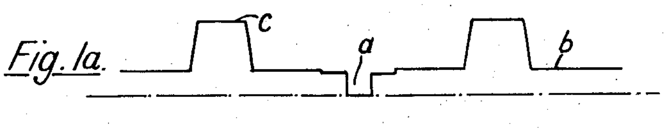

The present invention relates to television transmission systems of the carrier-current type and more particularly to terminal equipment for the reception of vestigial-sideband television signals.

The transmission of video signals over multichannel carrier systems presents certain difficulties which are in part due to the very wide band of frequencies including the very low ones which must be transmitted, and in part due to special amplitude characteristics of the signal.

The essential requirements for an efficient transmission system are that it must be economical in bandwidth and give a high signal-to-noise ratio.

Transmitted bandwidth is economized by the use of the "vestigial-sideband" method of transmission. In this method, the vision signal modulates a suitable high-frequency carrier wave. From the modulation products, one sideband, the carrier and a portion of the other sideband are selected. The resulting frequency spectrum, only slightly wider than that of the video signal, is then shifted to the frequency position required for the transmission over a cable.

To secure a maximum signal-to-noise ratio, it is desirable to suppress in the transmitted signal all components which do not carry intelligence. Thus, it is usual to reduce the amplitude of the carrier in the transmitted signal to a minimum. This leads to the use of a degree of modulation greater than that normally employed in carrier work. Therefore, in the transmission of television signals over carrier channels, a degree of modulation which exceeds the value commonly referred to as 100% is frequently used. For reasons which will become apparent later, such signals cannot be envelope demodulated at the receiver terminal. They must be demodulated by means of a locally generated carrier wave which must be frequency and phase locked to the incoming signal.

An object of the present invention is to provide an improved arrangement for deriving from the incoming wave a signal to synchronize the carrier-wave generator at the receiver terminal.

A feature of the present invention is the provision of a receiver terminal for vestigial-sideband television signals comprising a source of carrier wave, means coupled to the source of carrier wave and the input of the receiver terminal to recover the video signal from the received television signals, and a means coupled to the source of carrier wave and the input of the receiver terminal to adjust the frequency and phase of said source of carrier wave to that of the received signal during predetermined periods in response to the demodulated video signal.

Another feature of the present invention is the provision of a sampling means responding to the demodulated video signal to sample the received signal during the predetermined periods defined as the periods when the line and frame synchronizing pulses occur.

Figure 1B:
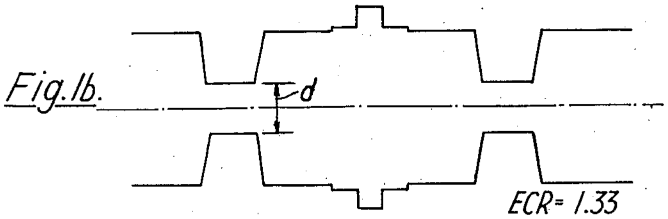
Figure 1C:
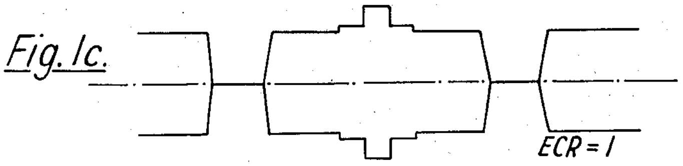
Figure 1D:
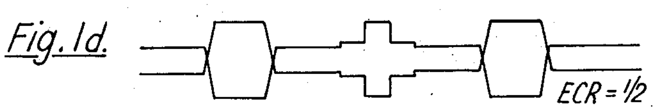
Figure 2:
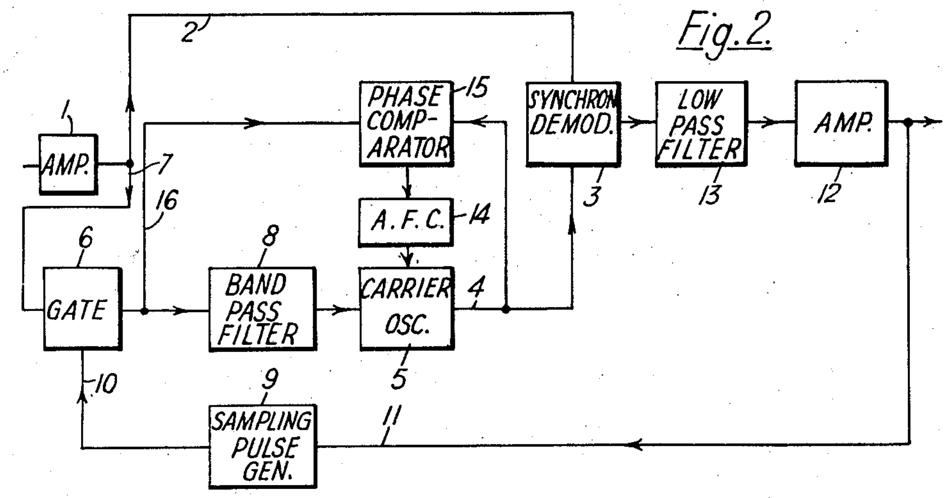

The above mentioned and other features and objects of this invention will become more apparent by reference to the following description taken in conjunction with the accompanying drawing, in which:

FIG. 1*a* illustrates graphically a video signal;

FIGS. 1*b* to 1*d* illustrate graphically various signals transmitted over a cable; and FIG. 2 is a block diagram of the receiver terminal according to the principles of the present invention.

A typical video signal is shown in FIG. 1*a*, in which "*a*" corresponds to a synchronizing pulse, such as a line synchronizing pulse, "*b*" to the black level and "*c*" to peak while level of the picture or video signal. As a result of amplitude modulating a carrier wave with the video signal of FIG. 1*a*, a signal as shown in FIG. 1*b* is transmitted. In the case shown, "negative" modulation is used, i.e., an increase of video amplitude corresponds to a decrease in amplitude of the transmitted signal. The degree of modulation shown in FIG. 1*b* is such that the amplitude of the transmitted signal never falls below a specified amount shown as "*d*." If for the same video signal the amount of carrier is reduced by the amount "*d*," a signal as shown in FIG. 1*c* will be obtained. This corresponds to 100% modulation, i.e., no signal is transmitted during "peak white" video signals. If the amount of carrier is reduced still further, the envelopes of the transmitted signal will interlace. This is shown in FIG. 1*d* and corresponds to a modulation in excess of 100% and is usually defined in terms of "excess carrier ratio," or ECR, which is the ratio of peak carrier amplitude in the composite wave to peak-to-peak excursion of the carrier envelope due to modulation. Thus, FIG. 1*c* corresponds to an ECR=1 and FIG. 1*d* to ECR=½. From FIG. 1*d*, it is apparent that, with reference to one sideband, the carrier transmitted during "peak white" periods of the picture is 180° out of phase with that transmitted during black periods. It will also be seen that the amplitude of the transmitted signal during synchronizing periods, such as the line-synchronizing periods, is equal to or less than that during "peak white" periods. The shape of the envelope shown in FIG. 1*d* is no longer the same as that of the original video signal. Envelope detection of such a signal would, therefore, introduce spurious frequency components into the demodulated video signal. For this reason, the incoming signal must be demodulated by means of a locally generated carrier having the correct frequency and phase.

A known method of generating a carrier frequency at the receiver terminal is based on the fact that, if the degree of modulation used at the transmitting terminal is less than a specified amount, the line and frame synchronizing pulses have a larger amplitude than the rest of the signal. They can, thus, be recognized on an amplitude basis and used to operate a gate circuit which samples the phase of the incoming signal during the line and frame synchronizing pulses. These samples are used to phase lock the local carrier oscillator to the incoming signals. The main disadvantage of this method is that if, for any reason, the degree of modulation should exceed a certain value, the amplitude of the line and frame synchronizing pulses will decrease relative to the rest of the signal, and the level-sensitive gate may sample the incoming signal when the carrier phase differs from the value it has during the line and frame synchronizing pulses.

In an alternative known method of synchronizing the carrier generator, a synchronizing signal is derived continuously from the received wave, this signal being independent of the phase reversal of the received wave as shown during "peak white" periods of FIG. 1*d*. In this method, the signal which controls the local oscillator is derived from the received signal after it has been frequency doubled. Since in the process of frequency doubling the phase of the incoming signal is also doubled, a phase jump of 180° in the incoming signal becomes a 360° phase jump and it does, therefore, interfere with the operation of the control circuit.

This method of synchronizing the local oscillator is independent of the degree of modulation used. It suffers, however, from several disadvantages. One of these is the polarity ambiguity in the demodulated video signal which is due to the squaring process used in the control of the local-carrier oscillator. Another practical difficulty arises because in the above method the phase lock of the local-carrier oscillator is adversely influence by the quadrature component of the received signal, which component is unavoidable in any asymmetrical-sideband method of transmission. Special measures and circuits must, therefore, be provided to alleviate this effect.

A method of generating the carrier wave at the receiver terminal which is free from the above objections will be described with reference to the block diagram of FIG. 2, in which for clarity only those circuits which are necessary for an understanding of the invention are shown. The individual circuits in the block diagram are well known and need not, therefore, be described in detail.

The incoming vestigial-sideband television signal is amplified in amplifier 1 (a source of television signal) and is applied over conductor 2 to demodulator 3 (means to recover the video signal from the television signal), such as a synchronous demodulator, in which the television signal is demodulated by a carrier generated in oscillator 5 (a source of carrier wave) and applied to the demodulator over conductor 4. Although the frequency stability of the local oscillator is of the same order as that of the oscillator used at the transmitting terminal, this stability is insufficient for distortionless demodulation of the received signal.

Two control loops (means to adjust) are provided to lock local oscillator 5 to the in-phase component of the received carrier although this component may suffer phase reversals during periods of modulation in excess of 100% and although the presence of synchronizing pulses in the received signal cannot be detected prior to demodulation.

The first control loop derives from the incoming signal the in-phase component of the carrier frequency. In this loop, part of the amplified incoming signal is applied to sampling gate 6 over conductor 7. Assuming for the moment that means are provided to open the gate only when line and/or frame synchronizing pulses are being received, it will be apparent that, at the output of bandpass filter 8 which is connected to the output of gate 6, a signal will be obtained which is identical to the in-phase component of the received carrier. This signal is injected into local-carrier oscillator 5 for the purpose of locking it to the received carrier. Sampling gate 6 is operated by pulses obtained from sampling-pulse generator 9 over conductor 10. The input to sampling-pulse generator 9 is obtained from the output of amplifier 12 over conductor 11. Amplifier 12 amplifies the video signal recovered in demodulator 3 and filtered in low-pass filter 13. The synchronizing pulses, both line and frame, in the video signal can be easily detected on an amplitude basis and are independent of the depth of modulation used.

The synchronization of local-carrier oscillator 5 is aided by an automatic-frequency-control circuit 14 which is actuated by a D.C. (direct-current) signal derived from phase comparator 15, which compares the phase of the locally generated carrier wave in lead 4 with that of the incoming signal during the synchronization pulses in lead 16. The time constant of the output circuit of phase comparator 15 is sufficiently long so that the D.C. signal is not disturbed by the periodic nature of the signal on conductor 16.

The terminal according to the invention will, when put into operation, lock itself automatically to the correct phase of the carrier component in the received signal. This is because the condition during which the carrier component in the received signal has the wrong phase, i.e., during peaks of overmodulation, is intermittent, and in particular because the carrier is never over-modulated during frame blanking periods in the television signal. Since the frame blanking period is more than 14 successive lines, the AFC (automatic frequency control) and phase-lock arrangement will be forced into synchronism with the correct phase of the carrier even if, by chance, the control mechanism synchronized itself initially to the wrong carrier component.

The method of synchronization described above can, of course, be extended by known means to television-receiver terminals in which two stages of demodulation are used to recover the video signal.

While we have described the principles of our invention in connection with specific apparatus, it is to be clearly understood that this description is made only by way of example and not as a limitation to the scope of our invention as set forth in the objects thereof and in the accompanying claims.

We claim:

1. A receiver terminal for vestigial-sideband television signals comprising:
   - a source of said television signals;
   - a source of carrier wave;
   - a synchronous demodulator coupled to both of said sources to recover the video signal of said television signals; and
   - means coupled to both of said sources and the output of said demodulator to adjust the frequency and phase of said source of carrier wave to that of said television signals during predetermined periods in response to said video signal.

2. A receiver terminal for vestigial-sideband television signals comprising:
   - a source of said television signals;
   - a carrier-wave oscillator;
   - a synchronous demodulator coupled to said source and and said oscillator to recover the video signal of said television signals; and
   - means coupled to said source, said oscillator and the output of said demodulator to adjust the frequency and phase of said oscillator to that of said television signals during predetermined periods in response to said video signal.

3. A receiver terminal for vestigial-sideband television signals comprising:
   - a source of said television signals;
   - a source of carrier wave;
   - a synchronous demodulator coupled to both of said sources to recover the video signal of said television signals; and
   - an automatic-frequency-control circuit coupled to both of said sources and the output of said demodulator to adjust the frequency and phase of said source of carrier wave to that of said television signals during predetermined periods in response to said video signal.

4. A receiver terminal for vestigial-sideband television signals comprising:
   - a source of said television signals;
   - a carrier-wave oscillator;
   - a synchronous demodulator coupled to said source and said oscillator to recover the video signal of said television signals; and
   - an automatic-frequency-control circuit coupled to said source, said oscillator and the output of said demodulator to adjust the frequency and phase of said oscillator to that of said television signals during predetermined periods in response to said video signal.

5. A receiver terminal for vestigial-sideband television signals comprising:
   - a source of said television signal;
   - a carrier-wave oscillator;
   - a demodulator coupled to said source and said oscillator to recover the video signal of said television signals;
   - a gate circuit coupled to the output of said source;
   - a sampling-pulse generator coupled to said gate circuit to control the conduction thereof;
   - means coupling said pulse generator to the output of said demodulator to control the operation of said sampling-pulse generator during the line and frame synchronizing pulses of said video signal;

a bandpass filter coupling the output of said gate circuit and said oscillator to control the frequency of said oscillator during said synchronizing pulses;

a phase comparator coupled to the output of said gate circuit and the output of said oscillator to produce a control signal indicative of the phase difference between the output of said oscillator and said television signals passed through said gate circuit; and a frequency control circuit coupled to said oscillator responsive to said control signal to control the frequency of said oscillator.

6. A receiver terminal for vestigial-sideband television signals comprising:

(*a*) a source of of said television signals;

(*b*) a source of carrier wave;

(*c*) means coupled to both of said sources to recover the video signal of said television signals; and (*d*) means coupled to both of said sources and the output of said means to recover to adjust the frequency and phase of said source of carrier wave to that of said television signals during predetermined periods in response to said video signal, said means to adjust including means responsive to the phase difference between said carrier wave and said television signals during said predetermined periods.

7. A terminal according to claim 6, wherein said predetermined periods are the periods during which the line and frame synchronizing pulses occur.

8. A terminal according to claim 6, wherein said means responsive includes a phase comparator having a time constant such that the output signals of said comparator are unaffected by the periodic operation of said means to adjust.

9. A receiver terminal in a carrier-current system for receiving vestigial-sideband television signals comprising:

(*a*) a demodulator of a kind requiring an input of a locally generated carrier wave to recover the video signal of said television signals;

(*b*) an oscillator for generating said wave; and (*c*) an automatic-frequency-control means to adjust the frequency and phase of said oscillator to that of the received television signal during predetermined periods, said automatic-frequency-control means including means for sampling the received television signal during said periods in response to the recovered video signal, said predetermined periods being the periods during which the line and frame synchronization pulses occur, and said automatic-frequency-control means operating in response to the phase difference between said locally generated carrier wave and said received television signal during said periods.

10. A receiver terminal in a carrier-current system for receiving vestigial sideband television signals comprising:

(*a*) a demodulator of a kind requiring an input of a locally generated carrier wave to recover the video signal of said television signals;

(*b*) an oscillator for generating said carrier wave; and (*c*) an automatic-frequency-control means to adjust the frequency and phase of said oscillator to that of the received signal during predetermined periods, said automatic-frequency-control means including means for sampling said received signal during said periods in response to the recovered video signal, said predetermined periods being the periods during which the line and frame synchronization pulses occur, said automatic-frequency-control means operating in response to the phase difference between said locally generated carrier wave and said received signal during said periods, and said phase difference being determined in a phase comparator having a time constant such that the output signal of said comparator is unaffected by the periodic nature of the sampled signal.

References Cited in the file of this patent

UNITED STATES PATENTS 2,750,440 Sziklai ---------------- June 12, 1956